COLOR TELEVISION SYSTEM

Original Filed Jan. 21, 1950 3 Sheets-Sheet 1

INVENTORS
WILSON P. BOOTHROYD
EDGAR M. CREAMER, JR.
BY
Alfred Stapler
AGENT

INVENTORS
WILSON P. BOOTHROYD
EDGAR M. CREAMER, JR.
BY
Alfred Stapler
AGENT

INVENTORS
WILSON P. BOOTHROYD
EDGAR M. CREAMER, JR.
BY Alfred Stapler
AGENT

United States Patent Office 3,087,011
Patented Apr. 23, 1963

3,087,011

COLOR TELEVISION SYSTEM

Wilson P. Boothroyd, Huntingdon Valley, and Edgar M. Creamer, Jr., Melrose Park, Pa., assignors, by mesne assignments, to Philco Corporation, Philadelphia, Pa., a corporation of Delaware Application Jan. 21, 1950, Ser. No. 139,928, which is a division of application Ser. No. 498,326, Mar. 31, 1955. Divided and this application Feb. 29, 1960, Ser. No. 11,570
33 Claims. (Cl. 178—5.2)

The present invention is directed to the transmission and reception of wave energy, the instant case being a division of our copending application, Serial No. 498,-326, filed March 31, 1955, which application in turn is a division of application Serial No. 139,928, filed January 21, 1950. In a preferred embodiment it relates to a television system in which images are synthesized at a receiver either in monochrome or in their natural colors.

At the present time there are two widely known systems for the transmission and reproduction of colored images. One of these is the so-called "field-sequential" method, wherein there is a cyclic change at field-scanning frequency of the several component colors utilized to effect the color representation. The other is the so-called "simultaneous" arrangement, wherein each of the component-color images is concurrently analyzed and reproduced.

Although the details of these two systems are generally known, it might be mentioned that the field-sequential apparatus may include a plurality of component color filters which are successively interposed between the photo-sensitive electrode of the camera, or pick-up, tube at the transmitter and the object which is to be televised. In this manner, the scene presented to the camera tube is broken down or analyzed in a predetermined manner. The individual color-component signals are transmitted and received in the same sequence as that in which they are developed, and then applied to a single image-reproducing tube. A rotating disc bearing a number of filter segments is so arranged in conjunction with this image-reproducing tube that a filter segment of appropriate color is caused to appear in front of the image producing cathode ray tube during the time that the signals representing that particlar color component are being received on the cathode ray tube control grid. Consequently, a series of color-component images are reproduced, which, due to the rapid succession in which they appear, effectively blend together, so that the observer views the resultant composite color picture. In other words, the so-called field-sequential system employs means whereby an object field may be successively scanned in the primary colors, and the signals corresponding to these primary colors transmitted through a single channel. At the receiver, the component-color signals are employed to successively recreate different color aspects of the original object field by means of a single scanning device.

In the simultaneous system, on the other hand, a plurality of signal trains are concurrently developed which are representative of the component colors of the object. These individual signal trains are then transmitted at the same time through three separate channels and employed to modulate the beams of separate image-reproducing tubes at a receiver. The light from each tube may then be focused through an appropriate color filter onto a translucent screen in such a manner that the three separate component-color images are effectively superimposed for viewing by an observer.

Each of the above-described systems possesses a number of distinctive characteristics. For example, in the field-sequential arrangement the rotating color filter discs at the transmitter and receiver require precise synchronization in order to avoid distortion of the reproduced image. Furthermore, the mere use of rotating mechanical elements is undesirable in many respects. The field-sequential system is also subject to color flicker and to color break-up under certain conditions, while the use of filter discs appreciably reduces the brightness of the image. The simultaneous system, on the other hand, requires three separate carriers each of which occupies a separate portion of the frequency spectrum.

The most important characteristic, however, is that in both of the described systems the required bandwidth for transmission is considerably higher than that now standardized for monochrome television. While the field-sequential system may be operated within a narrower bandwidth than would otherwise be necessary by reducing the number of component-color images transmitted within a certain time interval, this expedient increases the probability of flicker with its objectionable effect upon the observer. In the simultaneous system, it is possible to reduce the required bandwidth to a certain extent by employing a process wherein the low-frequency components of each of the red and blue primary colors are transmitted through relatively narrow channels. The channel transmitting the green signal is considerably wider, however, and not only carries the green low-frequency information but also includes the high-frequency components of all three colors. While this method operates satisfactorily, nevertheless the over-all bandwidth required for the transmission of the composite color signal is still appreciably greater than that of present black-and-white systems.

Another factor to be considered is that any system for the transmission of colored images should preferably be of such a nature that the images transmitted thereby shall be receivable by apparatus designed to receive black-and-white images. In other words, a color television system should be compatible with existing black-and-white apparatus, so that color television signals may be received in black-and-white by a monochrome receiver with no appreciable loss in resolution. Furthermore, it is desirable that a color television system be so designed that existing black-and-white receivers may be modified in a fairly simple manner so as to receive the color transmission in color. One very important feature in connection with the above is that the frequency band required for transmission of the color signals shoud be limited substantially to that now standardized for monochrome television. A still further desirable feature is that the color apparatus be of the all-electronic variety, so as to eliminate rotating filters and other moving parts.

In considering the factors involved in transmitting intelligence through a communication channel, it is found that in order to transmit the additional information necessary for a tricolor television system over that necessary for a monochrome system, three alternatives are available:

(a) The video bandwidth may be increased,
(b) The geometric detail of the image may be reduced, or
(c) The rate of transmission of the image may be reduced.

Inasmuch as the bandwidth should preferably be no greater than that now standardized for black-and-white, and inasmuch as the geometric detail of the image should preferably be maintained at its present level, there remains only the question of reducing the image transmission rate for practical consideration.

It is recognized that the rate of image transmission is closely tied up with the problem of flicker. In other words, there is apparently a minimum number of images which may be transmitted within a predetermined period of time in order that flickering will not be objectionable to an observer of the reproduced image. For example, studies have indicated that in tricolor field-sequential systems, field rates in the order of 60 per second for a complete color sequence are required to avoid flicker at a brightness level of approximately 50 foot-lamberts. This is higher than the threshold rate for monochrome transmission.

In a copending application filed January 14, 1949, by Wilson P. Boothroyd, Serial No. 70,951, now Patent No. 2,680,151, issued June 1, 1954, it is shown that an intelligence signal may be sampled at regular intervals, and the resulting signal will retain substantially all of the useful information present in the original signal provided that the sampling rate is equal to at least twice the highest useful frequency in the original signal . In carrying out one embodiment of the invention disclosed in this copending application, an intelligence signal is (1) Sampled at a rate equal to at least twice the highest modulation frequency,
(2) The pulse train thus formed is applied to a low-pass filter having a bandwidth approximately equal to the intelligence signal bandwidth,
(3) The output of the filter is combined with a gating signal,
(4) The combined signal is transmitted and received,
(5) The gating signal is filtered out, and
(6) The gating signal is used to trigger a demodulator in such a manner that the output thereof represents the amplitude of the intelligence signal at each of the time instants when it was sampled at the transmitter.

One fundamental principle set forth in the disclosure of the copending application is that an intelligence-transmission system in which the sampling frequency is equal to at least twice the highest modulation frequency results in substantially no crosstalk between adjacent pulses provided that the transmission bandwidth is adequate. As the width of the transmission channel is reduced, however, the tendency toward "overlapping," or cross-modulation, of the channel pulses increases. It has been shown in this Boothroyd patent that this cross-channel interference may be effectively neutralized by properly-designed networks which in effect develop time-spaced replicas of the received signal and add these replicas to the signal itself with such phase and amplitude that only the original modulation remains.

The concept of sampling an intelligence signal in the manner set forth above has been found to be applicable to television. In this case, a series of dots, or pulses, of video signal energy are obtained. The amplitude of each such pulse is determined by the ordinate of the video signal at the precise instant at which the pulse is developed. It has been pointed out above in connection with the discussion of applicants' copending application that the rate at which this sampling is performed should normally be equal to at least twice the highest video signal frequency in order for the signal to be reproduced without distortion at the receiver. However, it will now be shown that there is a critical relationship existing among the sampling frequency, the bandwidth of the communication channel, and the bandwidth of each of the component color signals developed at the transmitter.

In considering the interdependence of transmission bandwidth and sampling frequency, let it be assumed that a sinusoidal wave is sampled by a square sampling function occurring at periodic intervals. It can be shown that if this sampled wave is transmitted through a low-pass filter cutting off sharply at a frequency equal to the highest intelligence frequency, then the intelligence may be recovered substantially without distortion provided that the lower sideband of the wave does not fall within the passband of the filter. Thus, the requirement for instantaneous recovery of the undistorted intelligence is that for normal sampling the intelligence must be less than one-half the sampling frequency.

In accordance with one feature of the present invention, the above principle is utilized for the transmission of images in natural color. Let it be assumed, for example, that three component-color video signals have been developed each of which has a bandwidth in the order of 4 megacycles. These component-color signals may be similar to those which are developed in the so-called "simultaneous" system previously referred to. Each of the cameras from which these component-color signals are obtained may operate in the usual manner on a 60-field 30-frame basis. The signal in each of these video channels is next sampled in sequence at a rate equal substantially to 2.68 mc. per second, and the resulting pulses interleaved into a train having a frequency of approximately $8.04 \cdot 10^6$ pulses per second. It will be noted that while the composite pulse train is amplitude-modulated, nevertheless the amplitudes of adjacent pulses are entirely independent. However, the amplitude of every third interleaved pulse has been derived from the same input signal. The pulse train is then passed through a filter having an upper cut-off frequency of approximately 4.02 megacycles, following which it is transmitted in any suitable manner.

Referring again to applicant's copending case above mentioned, it is shown therein that when a modulated pulse train of a given frequency is passed through a filter having an upper cut-off limit of half the pulse frequency, the resulting signal waveform is characterized by having instantaneous amplitude levels corresponding to those of the input pulses at discrete equally-spaced time instants only. It is thus necessary to resample the received signal at these equally-spaced time instants in order to derive the original pulse modulation.

This can be accomplished if the receiver incorporates some form of gating apapratus which is operated in synchronism with the gating mechanism at the transmitter. One method of synchronizing these two gating devices is by the application of the received carrier signal to the receiver gate. The lattter may also act as a distributor to separate each component-color signal making up the composite pulse train into its proper color channel.

It has been stated above that the act of sampling a color-component video signal wave at the transmitter produces a pulse the amplitude of which corresponds to the instantaneous ordinate of the channel modulation. This is true regardless of either the modulation frequency or the sampling rate, and a system operating in such a fashion will enable these sampled "bits" of input information to be reproduced on the cathode-ray tube at the receiver. However, if the modulation frequency is excessive (or, in other words, if it is greater than one-half the sampling rate) then these transmitted pulses will not ordinarily yield a distortionless reproduction of the original scene in an insstantaneous transmission system. However, since television systems operate on a sequential rather than on an instantaneous basis, it has been found, in the case of a video signal transmitted by means of discrete pulses, that the "dots" developed on the screen of the image-reproducing tube as the result of the reception of these pulses may be arranged in such a manner as to take advantage of the integrating action of the tube phosphor. In other words, while it has been known for many years to employ vertical (or line-by-line) interlacing as a means of reducing flicker effects, it has now been found possible by means of the herein-disclosed principle of dot transmission to apply this interlacing action not only in a vertical direction, but also in a horizontal direction. In other words, the dots may be made discontinuous both horizontally and vertically within a single field scanning, leaving spaces therebetween which are filled in during subsequent field scannings.

To illustrate the above principle, assume a set of unmodulated rectangular pulses having a width $d$ and a period T. They can be defined by a Fourier series such as $$f(t)=\frac{d}{T}\left(1+2\sum_{1}^{\infty}\alpha_m \cos m\omega_0 t\right) \qquad (1)$$

where $$\alpha_m=\frac{\sin\frac{\pi m d}{T}}{\frac{\pi m d}{T}}$$

and $$\omega_0=\frac{2\pi}{T}$$

Now if a signal consisting of D.-C. and sinusoidal terms, such as $A(1+m \cos \omega_a t)$, is sampled by this set of pulses, then the modulated set of sampling pulses can be expressed as $A(1+m \cos \omega_a t)f(t)$. A Fourier analysis of the spectrum of the pulse train ( the width $d$ of the pulses being small compared to their period T) shows it to consist of the original modulation plus a group of carriers at the sampling frequency and harmonics thereof, each with an upper and lower sideband. This is expressed by the equation $$A(1+m \cos \omega_a t)f(t)=Af(+)+Am\frac{d}{T}\left[\cos \omega_a t + \sum_{1}^{\infty}\alpha_m \{\cos (m\omega_0+\omega_a)t+\cos (m\omega_0-\omega_a)t\}\right] \qquad (2)$$

Assume now that the modulating signal $\omega_a$ has a frequency between $f$ and $2f$ cycles per second and is sampled at a rate of $2f$ cycles per second, with the resulting pulse train being transmitted through a system of bandwidth $f$ cycles. Then Equation 2 is the expression for the pulse train spectrum, and, after transmission with the resultant filtering, the output becomes $$\frac{Ad}{T}+\frac{mAd}{T}\alpha_1 \cos (\omega_0-\omega_a)t \qquad (3)$$

That is, the output consists of a D.-C. term plus only the lower sideband of the fundamental sampling frequency. However, if the same modulation is now resampled at a subsequent time, such as during the next field-scanning period, and at instants related to the original sampling by the interval $T/2$, the transmission system output is $$\frac{Ad}{T}+\frac{mAd}{T}\alpha_1 \cos (\omega_0=\omega_a+m)t \qquad (4)$$

Now if at the receiver each of the signals represented by Equations 3 and 4 is sampled by a gating device, at a rate and at a phase corresponding to the initial sampling of that signal, a new pulse train is formed. From Equations 3 and 1

$$A\left(\frac{d}{T}\right)^2\left[1+2\sum_{1}^{\infty}\alpha_m \cos m\omega_0 t\right] + m\alpha_1 A\left(\frac{d}{T}\right)^2\left[\cos (\omega_0-\omega_a)t + \sum_{1}^{\infty}\alpha_m \{\cos (m\alpha_0+\omega_0-\omega_a)t+\cos (m\omega_0-\omega_0+\omega_a)t\}\right] \qquad (5)$$

and from (4) and (1)

$$A\left(\frac{d}{T}\right)^2\left[1+2\sum_{1}^{\infty}(-1)^m\alpha_m \cos m\omega_0 t\right] - m\alpha_1 A\left(\frac{d}{T}\right)^2\left[\cos (\omega_0-\omega_a)t + \sum_{1}^{\infty}(-1)^m\alpha_m \{\cos (m\omega_0+\omega_0-\omega_a)t + \cos (m\omega_0-\omega_0+\omega_a)t\}\right] \qquad (6)$$

If each of these signals from the receiver gate, as expressed by Equations 5 and 6, is now passed through a filter having a bandwidth sufficient to pass the modulation frequency spectrum only (between zero and $2f$) the filtered output for each input signal becomes:

For (5)

$$A\left(\frac{d}{T}\right)^2[1+m\alpha_1 \cos (\omega_0-\omega_a)t+m\alpha_1^2 \cos \omega_a t] \qquad (7)$$

and for (6)

$$A\left(\frac{d}{T}\right)^2[1-m\alpha_1 \cos (\omega_0-\omega_a)t+m\alpha_1^2 \cos \omega_a t] \qquad (8)$$

Each of these signals may now be presented in sequence to an adding or integrating device (such as the cathode-ray tube) which will combine the signals in accordance with their original relative orientation in time, and the result of the addtion will be a signal of the form $$A\left(\frac{d}{T}\right)^2[2+2m\alpha_1^2 \cos \omega_a t] \qquad (9)$$

This signal contains only the original modulation, which has now been recovered. For signals of modulation frequency less than $f$, the output waveform, after passing through the receiver gate, can be found by multiplying together Equation 1 and the modulation terms of Equation 2, and eliminating all terms which are out of the system passband. It therefore follows that the depth of modulation is the same for input signals both above and below the frequency $f$ (but less than $2f$), and that all terms other than the modulation cancel in the adding process.

The above analysis shows that it is possible to maintain the amount of detail in the reproduced image, while at the same time reducing the bandwidth which would otherwise be required through an increase in the time necessary for transmission of a complete tricolor image. Furthermore, flicker may be maintained substantially at its present black-and-white level by retaining the presently-standard field-repetition rate at 60 per second. Since interlacing will now be carried out in both horizontal and vertical directions, however, four fields are required to produce a complete image, and hence the frame repetition rate becomes 15 per second.

The 60-field 15-frame system to be described operates in such a manner that each horizontal line is scanned twice during each frame, with the effective position of the line being shifted horizontally by the width of a single dot between each scanning operation. Thus during the second scan the dots are laid down intermediate the dots created by the first scansion of this same line by the cathode-ray beam. It can now be shown that modulation frequencies up to the sampling frequency can be faithfully reproduced at the receiver, and with the above-mentioned composite pulse train frequency of 8.04 mc. it now becomes possible to admit from each of the three color cameras a component-color video signal having a frequency as high or even higher than 2.5 mc. without color signal crosstalk.

In order to control the receiver gating apparatus from the transmitter, a burst of 2.68 mc. (for a three-color system) gate carrier signal may be applied during a portion of each horizontal blanking interval directly to the input of the transmitter filter. At the receiver, these bursts of carrier energy may be separated from the remainder of the signal by any suitable time gating and filtering device and applied to synchronize line-by-line an oscillator nominally operating at gate carrier frequency. In this connection, it should be noted that the phase of this 2.68 mc. carrier may be reversed at a 15 cycle rate at the transmitter (during vertical retrace) in order to reverse the phase of the receiver oscillator and hence obtain horizontal interlace. In other words, by such an expedient the reproduced image raster is shifted horizontally by an amount equal to the distance between the centers of adjacent dots in the complete picture during every other vertical blanking interval, although of course this frequency of phase reversal of the gating signal depends upon the particular interlacing pattern employed.

It should be further noted in connection with the 2.68 mc. gate carrier wave that since its phase is preferably reversed every 1/30 of a second, the beat-frequency pattern which would otherwise be produced on the screen of the image-reproducing tube is almost completely eliminated, since its frequency is effectively doubled. In practice it becomes of such low value as to cause no appreciable reduction in image contrast.

Summarizing the above, therefore, the present invention in one embodiment permits a three-color, 2.5 mc. per color, video signal to be transmitted without any appreciable intercolor cross modulation through a 4 mc. channel at half the usual frame speed. This is fully in accordance with the relationship previously set forth between the modulation frequency and the rate at which this modulation is sampled, inasmuch as the time period for transmission in the disclosed arrangement is doubled. It should be noted at this point that any system which exceeds the limit mentioned will be subject to distortion, in the sense that any change in the amplitude of one color signal will affect the remaining color signals. This is especially true when modulation frequencies are high. It is true, for example, in cases where the sampling rate is raised to, say, 3.8 mc. per color, with the modulation frequency being increased to 3.6 mc. in each of the three component-color channels. Although such an expedient renders a receiver operating in this manner readily capable of receiving monochrome television signals, nevertheless the crosstalk, or inter-dot cross-modulation, during color reception will result in a considerable decrease in definition in the reproduced image. Furthermore, the quality of the color image at the receiver will depend to a large extent upon the characteristics of the televised scene, and will be quite low when reconstituting a scene which includes a considerable amount of detail and color contrast between adjacent image areas.

One object of the present invention, therefore, is to provide an improved method and apparatus for the transmission and reception of wave energy.

Another object of the present invention is to provide an improved television method and apparatus which is particularly but not exclusively directed to the transmission and reproduction of images in their natural colors.

An additional object of the present invention is to provide a television system in which the reproduced image is composed of a plurality of discontinuous areas which may be interlaced horizontally and/or vertically for viewing by an observer.

A further object of the present invention is to provide a television system in which use is made of the integrating properties of the image-reproducing cathode-ray tube to permit an increase in the effective time interval during which a predetermined amount of image information may be transmitted, thereby reducing the bandwidth which would otherwise be required.

A still further object of the present invention is to provide a color television system in which the various component-color signals are periodically sampled at the transmitter, multiplexed to form a train of pulses, and then passed through a filter having a cut-off frequency equal approximately to one-half the sampling frequency.

A still further object of the present invention is to provide a color television system in which a definite relationship is established among the bandwidth of each of the component-color signals, the frequency at which these component-color signals are sampled at the transmitter, and the bandwidth of the communication channel.

An additional object of the present invention is to provide a color television system, of the type described, in which each of the component-color signals includes frequencies high enough to convey full color information, these signals nevertheless being transmitted without the necessity of employing separate high-frequency by-pass circuits.

A further object of the present invention is to provide, in a television system of the type described, means whereby the position of the image raster developed on the face of the image-reproducing tube may be shifted horizontally by the space of one discrete image area during every other vertical blanking interval, thereby effecting an interlacing of such discrete image areas in a horizontal direction.

A still further object of the invention is to provide means whereby a portion of each horizontal blanking interval is utilized for the purpose of transmitting a synchronizing impulse consisting of a burst of high-frequency energy, this high-frequency energy being utilized at the receiver for the purpose of synchronizing the sampling pulse generator forming a part thereof with the corresponding sampling pulse generator at the transmitter.

Other objects and advantages of the invention will be apparent from the following description of one form of the invention and from the drawings, in which.

Figure 1:
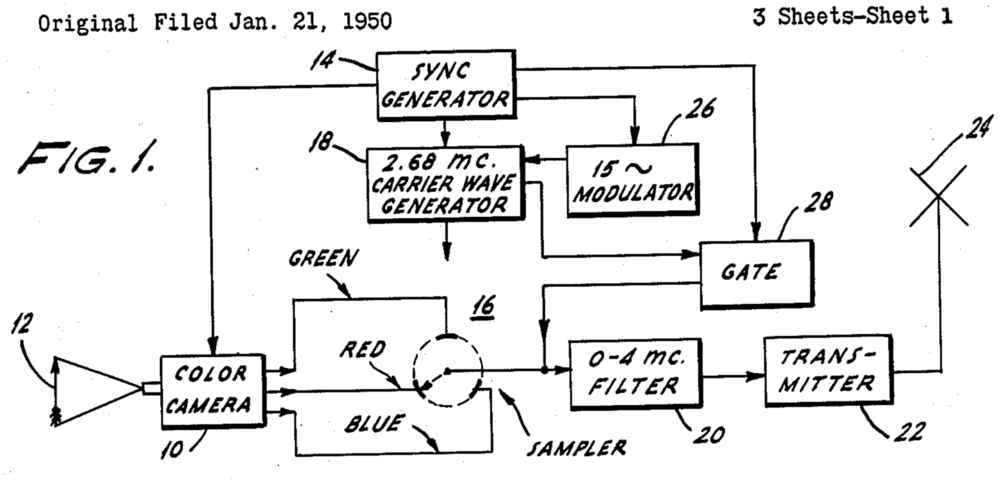
FIG. 1 is a block diagram of one form of color television transmitter constructed in accordance with the principles of the present invention.

Referring now to FIG. 1, there is shown a system for transmitting images so that they may be received and reproduced in their natural colors. However, the color television system to be described herein is merely one embodiment of applicants' inventive concept, and it is to be understood that the principles of the invention are fully applicable to television arrangements in which an image is transmitted and received for reproduction in monochrome.

A color camera 10 is focused upon an object 12 of which a color representation is to be transmitted and reproduced. The camera 10 operates to produce in the output thereof three component-color signals, such, for example, as red, green and blue. Since camera 10 may be of a type now known in the art, it has been shown by a labelled rectangle in order to simplify the drawing, although it might include three separate pick-up tubes of the "orthicon" type each of which operates on a standard 60-field 30-frame basis. It is supplied with horizontal and vertical synchronizing pulses in the usual manner from a synchronizing generator 14, so that each of the three component-color signals in the output of the camera 10 are complete video waveforms.

These three component-color signals developed by the camera 10 are supplied to a sampling device which is generally indicated in the drawing by the reference numeral 16. Although this sampling device 16 is illustrated schematically as including a rotating switch arm, it will be understood that it is actually of an all-electronic nature. Circuit arrangements for performing the sampling function of the unit 16 are well known in the art, and may incorporate, for example, a gated electron discharge tube in each of the red, green and blue channels. These tubes may be gated on sequentially, and their sequential output signals combined to produce the single output signal of the sampler 16. To provide equally-spaced samples of the red, green and blue signals, gating of the three electron tubes may be accomplished in response to signals derived from equally-spaced taps on a delay line which is supplied at its input terminals with actuating signals of the appropriate frequency, as described in the above-mentioned copending application of the joint applicant, Wilson P. Boothroyd, Serial No. 70,951, filed January 14, 1949, now Patent No. 2,680,151, issued June 1, 1954.

Figure 2:
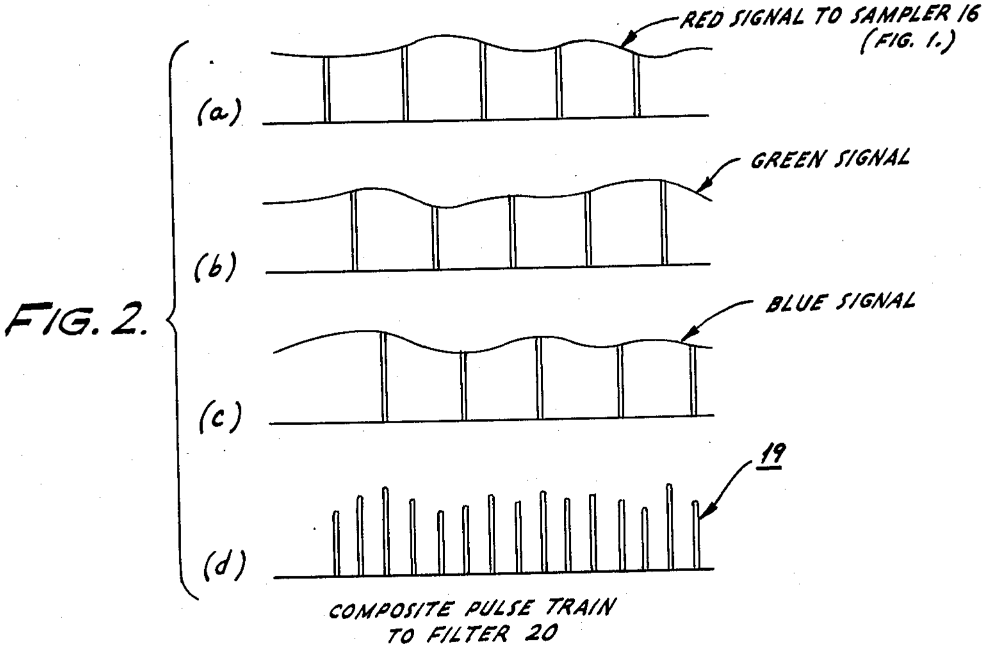
FIG. 2 is a set of waveforms illustrating the operation of the sampling unit of FIG. 1.

The three component-color signals in the output of the camera 10 are consecutively sampled by the device 16 as shown in curves (*a*), (*b*) and (*c*) of FIG. 2 at a rate equal to, say, 2.68 megacycles per second. In order to carry out this operation, the initiating or triggering impulses for the sampler 16 are supplied from a 2.68 megacycle carrier wave generator 18 which is synchronized in its operation with the generator 14. This can be readily accomplished, inasmuch as 2.68 mc. is the 170th harmonic of the horizontal sync pulse output of the generator 14. For reasons to be indicated in detail hereinafter, carrier wave generator 18 is preferably controllable to permit reversal of the phase of the signal therefrom, and to this end may suitably comprise a conventional phase splitting device for producing the carrier wave signal in each of two opposite phases, and a pair of controllably-actuatable gating devices for supplying one or the other of these phases of carrier wave signal to the output terminal of generator 18, as determined by externally applied modulating signals. The energy from the sampler 16 is therefore in the form of a composite pulse train 19 the pulses of which occur at a rate of $8.04 \cdot 10^6$ pulses per second.

This composite pulse train 19 is applied to a filter 20 having a passband from zero frequency to approximately 4 mc., with a sharp cut-off at the latter point. The output of the filter 20 is applied to modulate a standard television transmitter 22 for transmission in a conventional manner from the antenna 24. It will be understood that, if desired, the filter 20 may include an equalizer network of the type shown in applicants' copending case above referred to.

A 15 cycle square wave modulator, or phase-changer, 26 is also synchronized in its operation from the generator 14, and acts to reverse the phase of the 2.68 mc. wave developed by the pulse generator 18 at a 15 cycle rate. The reason for this action will be later brought out. As an example of a conventional arrangement for accomplishing this phase reversal, there may be employed a two-to-one frequency dividing circuit and appropriate pulse-forming devices for deriving a 15-cycle square wave from the 30 cycle signals normally available in the sync generator 14. The 15-cycle square wave may be passed through a conventional phase splitter, the two output signals of which may be used to control the above-mentioned gating devices in carrier wave generator 18 so as alternately to supply opposite phases of the carrier wave signal from generator 18 to sampler 16, during successive intervals of one-thirtieth second duration. General arrangements for accomplishing this operation are well known, and will be found, for example, in FIGURE 9 of Patent No. 2,386,087, issued October 2, 1945, to F. J. Bingley et al.

It has been stated above that the sampling device 16 of FIG. 1 must operate in synchronism with a corresponding sampling device at the receiver in order to avoid distortion of the reproduced image. The means for synchronizing the operation of these two sampling devices includes a gate circuit 28 which is connected to the synchronizing generator 14 in such a manner that the gate 28 opens during a portion of each horizontal blanking interval, and thus permits the passage therethrough of the 2.68 mc. wave developed by the generator 18. This switching function may be accomplished by any of a large number of known circuits, such as by one of the gating multivibrators described on pages 166 through 170 of volume 19 of the Radiation Laboratories Series published by the Massachusetts Institute of Technology. Such a multivibrator, for example, might be triggered by the differentiated trailing edge of each horizontal synchronizing pulse from the generator 14 so as to remain in a quasi-stable state for all or a portion of the remainder of the blanking interval. By this mode of operation, a burst of high-frequency energy is applied to the input of the filter 20 during horizontal blanking (when no video signal is being received from the camera 10). It will be brought out in connection with a description of the receiving apparatus that this periodic burst of high-frequency energy may be utilized for controlling the sampling apparatus at such point.

It should be noted that the composite pulse train 19 which is applied to the filter 20 consists of three separate series of component-color pulses, and that the amplitudes of adjacent pulses in this train are entirely independent. The amplitude of every third interleaved pulse, however, is derived from the same input modulation.

Figure 3:
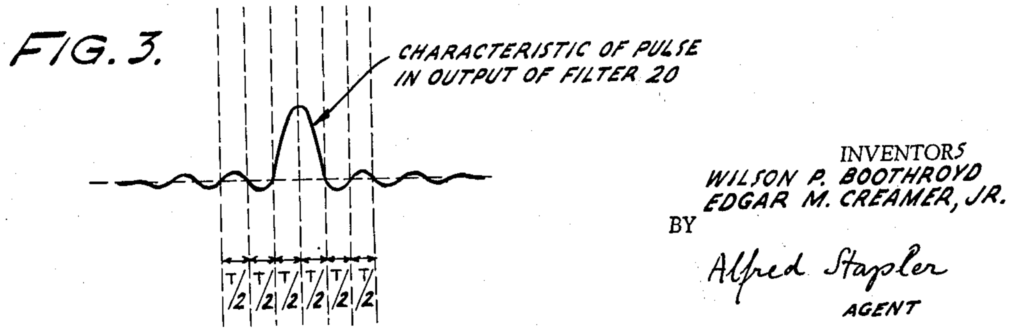
FIG. 3 shows the characteristic of a representative pulse in the output of the filter of FIG. 1.

It has been mentioned above that when a modulated pulse train of a given frequency (in this case 8.04 mc. per second) is passed through a filter having an upper cut-off limit ($f$) of approximately half the pulse frequency, then the resulting signal waveform is characterized by having instantaneous amplitude levels corresponding to those of the input pulses at discrete equally-spaced time instants only. This is set forth in applicants' copending application, Serial No. 70,951, now Patent No. 2,680,151, issued June 1, 1954, above-mentioned. Since in FIG. 1 the filter 20 is arranged to cut off at approximately 4 mc., the above signal characteristics will be present, and the discrete equally-spaced time instants will be separated by $T/2$, where T is the pulse period. This may be seen in FIG. 3 by the representation of a single pulse in the output of filter 20, and shows that the energy extending from this pulse into adjacent channels is substantially zero at such equally-spaced time instants. This results in negligible crosstalk, or interchannel modulation, as long as the above operating conditions are maintained.

Thus a requirement for recovering the original video modulation is that the composite pulse train (such as 19 in FIG. 2) be applied to a low-pass filter having a substantially linear phase characteristic and a passband at least equal to the modulation bandwith. The output of the filter will then contain only the original modulation, provided that the sampling frequency is greater than twice the highest modulation frequency so that the lower sideband of the fundamental sampling frequency does not fall within the modulation range. If the highest modulation frequency exceeds one-half the sampling rate, or if the filter assembly does not suppress frequencies above one-half the sampling frequency, then the lower sideband of the fundamental sampling frequency will also be passed by the filter, and this will normally prevent an undistorted recovery of the original intelligence.

Figure 4:
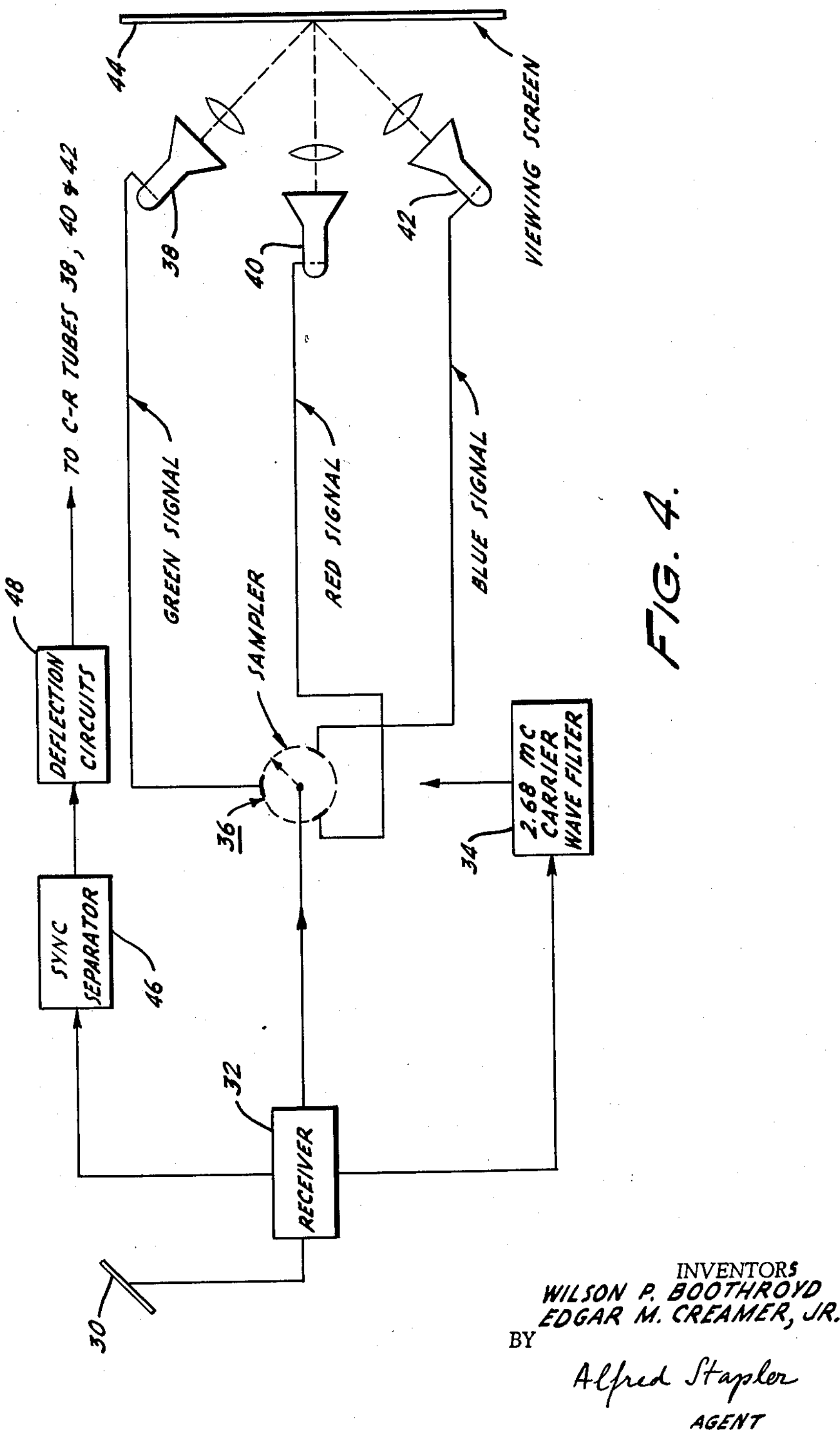
FIG. 4 is a block diagram of one form of television receiving system constructed in accordance with the principles of the present invention, and designed to receive the signal transmitted by the apparatus of FIG. 1.

In FIG. 4 is shown one form of color television receiver suitable for receiving the signal transmitted by the apparatus of FIG. 1. The composite-color signal is picked up by a dipole or other antenna 30 and applied to a receiving unit 32 which acts to demodulate the signal in a conventional manner. A time-gated carrier wave filter 34 (which may comprise a highly selective amplifier) acts to separate from the composite signal the 2.68 mc. component, and the latter is then utilized to control the operation of a sampling unit 36. This sampling unit 36 may be identical to the sampling unit 16 of FIG. 1, and, when properly phased with the latter by any suitable means known in the art, acts to sample the composite-color signal output of the receiver 32 in synchronism with the sampling action of the unit 16 at the transmitter. Thus the received pulse train 19 is broken up into three series of pulses similar to those representing the three sampled component-color signals in the output of the color camera 10 of FIG. 1 (curves (*a*), (*b*) and (*c*) of FIG. 2), and these three pulse trains may be respectively applied to three image-reproducing cathode-ray tubes 38, 40 and 42 to modulate the electron scanning beams therein.

The tubes 38, 40 and 42 are focused upon a translucent viewing screen 44 in such a manner that the separate images produced thereby are in effect superimposed one upon the other. It will be of course understood that the cathode ray tubes are provided with appropriate colored phosphors, or else are employed in conjunction with appropriate color filter elements in the optical path to the viewing screen 44. The images respectively developed on the screen 44 by each of the image-reproducing tubes 38, 40 and 42 will accordingly represent the green, red and blue color components of the image 12 at the transmitter, while the image produced by the superimposition of these component-color images will be a complete color representation of the televised optical image.

It will likewise be understood that the receiving system of FIG. 4 includes the usual synchronizing separator unit 46 and appropriate deflection circuits 48 for simultaneously deflecting the electron scanning beams of the three cathode ray image-reproducing tubes 38, 40 and 42. However, these conventional circuits have not been specifically illustrated in order to simplify the drawing.

It has been brought out above that one of the features of applicants' invention resides in the use of the integrating action of each image-reproducing element at the receiver to permit a reduction in the normal transmission bandwidth through the expedient of increasing the effective transmission time of a complete television image. In other words, the video intelligence is sampled over a relatively long time interval, and then subsequently reproduced by integration over this same time interval. The result is similar to that which would be obtained by transmitting the same video intelligence within a shorter time interval with a higher sampling rate, although in the latter case an increase in transmission bandwidth is required.

Thus, in accordance with one embodiment of the present invention, the points or dots of light produced on the face of each of the image-reproducing cathode-ray tubes 38, 40 and 42 in FIG. 4 during different field-scanning operations are effectively added together by interlacing them in both vertical and horizontal directions. In order to bring this about, each line of each of the three component-color signals developed by the camera 10 at the transmitter is sampled twice by the unit 16, with the points or dots of these two sampling sequences occurring in alternate field-scannings of the tubes 38, 40 and 42. Each point or dot of any one sequence is equally time-spaced between the points developed during the previous sequence. Thus the complete line-sampling operation now requires a time equal to two normal line-scanning intervals, permitting the transmission of the video intelligence without distortion (in the full modulation bandwidth of zero to 2*f* cycles per second) through a communication channel having a bandwidth of *f* cycles per second. This result is not inconsistent with Hartley's law, since a longer time of transmission is made use of. It is only necessary that the receiver gating apparatus have a wide passband and operate at a high level. Also, the receiver circuits which follow the gate must be able to pass the full intelligence signal without a cutting of its selective sidebands.

One means by which the above-mentioned sampling sequences may be integrated or added is to present each sampling signal to a cathode-ray tube having a phosphor of sufficient persistence that two successive sampling signals may be effectively overlaid. Thus, each cathode-ray tube acts as a light-storage device during two successive signal periods. It is not necessary that long-persistence phosphors be used to accomplish this result, as it has been found in practice that phosphors of single or double field persistence are satisfactory for this purpose.

Figure 5:
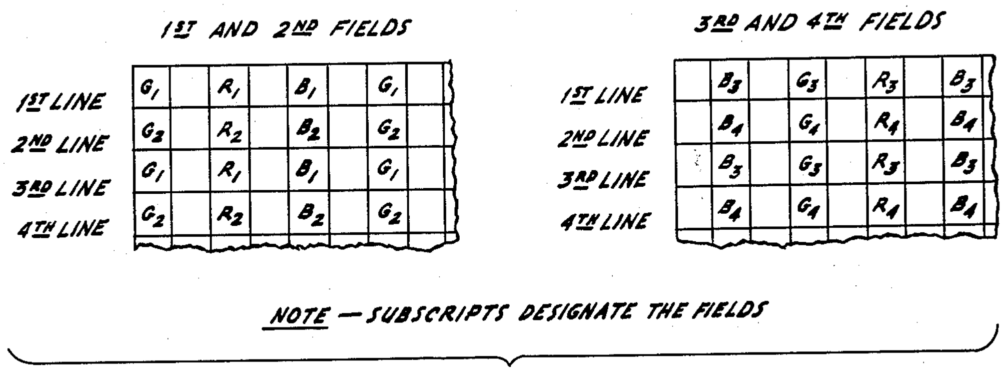
FIG. 5 is a portion of a receiver image raster area illustrating one manner in which horizontal interlacing in accordance with the present invention may be performed by the apparatus of FIGS. 1 and 4.

The presentation of the complete television image on the viewing screen 44 may thus take the form of an orderly arrangement of dots of light. In the particular embodiment of applicants' invention being described, these dots or points of light may be so developed that a scanning dot structure such as shown in FIG. 5 is produced. In this illustration, which includes a portion only of the complete image raster area, the red, blue and green dots or points of light are indicated by the letters R, B and G, respectively. In the first line-scanning of the image raster, the dots are discontinuously laid down in an order such as $G_1$, $R_1$, $B_1$, $G_1$, and so on. With normal vertical interlacing, the third line of the raster is then scanned in a similar manner, that is, the dots are in the same order $G_1$, $R_1$, $B_1$, $G_1$, etc. Thus, standard vertical interlacing is employed but only half of each line has been laid down. In the second field the second, fourth, etc. lines are scanned in an identical fashion—$G_2$, $R_2$, $B_2$, $G_2$, and so on.

In the third field-scanning of the image raster of FIG. 5, the dots laid down are positionally interlaced with the dots laid down during the first field. This is accomplished by horizontally shifting the position of the image raster by approximately the width of a dot area, so that the dots developed during this third field-scanning fall between the dots laid down during the first field-scanning. Referring again to FIG. 5, the dots or points laid down during the third field scanning are designated as $B_3$, $G_3$, $R_3$, $B_3$, and so on. Similarly, the fourth field is displaced vertically with respect to the third field and horizontally with respect to the second field, so that the dots laid down during the fourth field are in the locations $B_4$, $G_4$, $R_4$, $B_4$, and so on. It will thus be appreciated that before the third field-scanning a horizontal color shift occurs which is maintained during the fourth scanning operation, such that the dots produced during these third and fourth field-scannings interlace with the dots produced during the first and second field scannings. At the end of the four fields, a complete color picture has been developed on the viewing screen 44.

It will be noted that in the particular pattern illustrated in FIG. 5 the dot signals for each color fall in vertical alignment on the viewing screen. This permits the alternative use of a colored line phosphor tube designed so that the respective colored phosphors are laid down in vertical strips. Thus, direct-view color reception is possible with a single cathode ray image-reproducing tube, although some means may be required accurately to register the various channel signal pulses on their respective color strips.

The color shift which brings about the interlacing of the dots during the third and fourth field-scannings to produce the pattern of FIG. 5 is preferably accomplished by means of the 15-cycle modulator 26 in the transmitter of FIG. 1. This modulator reverses the phase of the 2.68 mc. carrier wave generator 18 every 1/30 of a second during vertical blanking so as automatically to maintain the desired horizontal interlacing at the receiver. However, in an alternative design the modulator 26 is omitted, and the frequency of the generator 18 modified so that it is not an integral multiple of the line frequency. In this event a horizontal shift equal to one-half the dot spacing may be obtained in alternate lines. For example, if a sampling frequency of 2.685 mc. is selected (a value which is 170.5 times the horizontal line rate) then an image having an odd number of horizontal lines in two fields (such as the presently standard 525 line image) will be dot interlaced automatically.

The interlacing pattern shown in FIG. 5 is predicated on equal resolution (or in other words equal sampling intervals) of all three component colors. However, it is recognized that in some instances it may be desirable to use another form of interlacing in which one color (such as green, for example) is accorded in preponderance of the transmission time. In such a case, it is possible to maintain the combined 8.04 mc. sampling rate above set forth, while at the same time allocating a sampling rate of 4.02 mc. to the green color and 2.01 mc. to each of the remaining colors red and blue. A limitation of the input or modulation frequencies might then be desirable, perhaps to a maximum of 3.8 mc. for green and 1.9 mc. for each of the red and blue colors. In such an arrangement, the sampling might be carried out by some such mechanism as that shown in FIG. 6, wherein the sampling device 16a in the green component-color signal channel is driven by an initiating wave occurring at a 4.02 mc. rate and supplied by a generator 18a.

Figure 6:
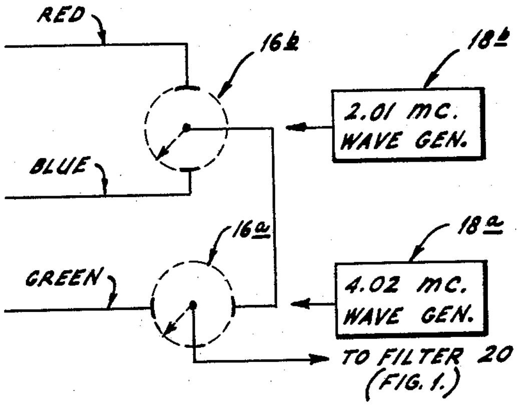
FIG. 6 shows a modification of the sampling unit of FIG. 1.

An auxiliary-sampling unit 16b is also shown in FIG. 6. This unit 16b samples the red and blue component-color signals alternatively, and operates at a frequency of 2.01 mc. It may be controlled by a further wave generator 18b.

Figure 7:
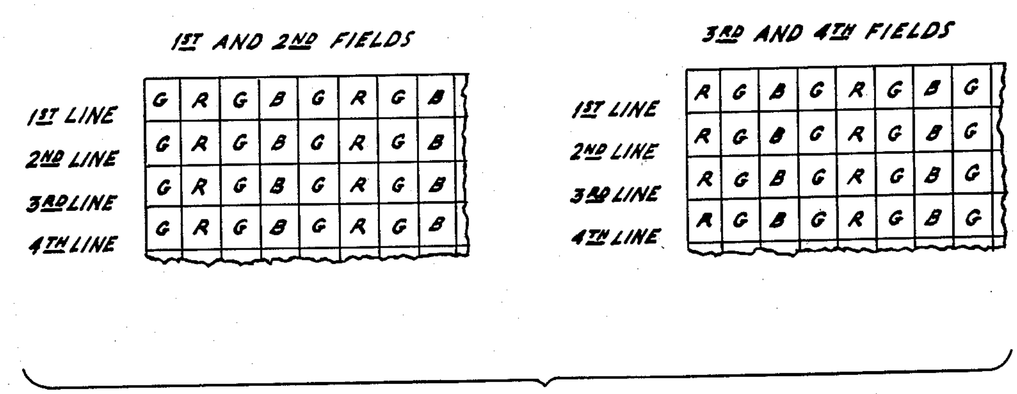
FIG. 7 shows how portions of a receiver image raster area may appear when the sampling unit of FIG. 6 is employed.

When the sampling device of FIG. 6 is employed, the basic sampling rate becomes 4.02 mc., with the green component-color signal being sampled at this rate and the red and blue component-color signals alternately. The result of such a mode of operation may then be as shown in FIG. 7, which, as in the case of FIG. 5, illustrates a portion only of an image raster area. It will of course be understood that the particular sampling arrangement of FIG. 6 is now incorporated in both the transmitting and receiving units. It will be noted in FIG. 7 that the red and blue component colors each cover one-quarter of the raster area, with the resolution for the green channel being increased over that shown in FIG. 5, for example. It will furthermore be noted that there is a color transposition from the second field to the third field, and also from the fourth field to the first field. This may be accomplished by means of a phase reversal of the carrier wave generator (such as 18 in FIG. 1) during every other vertical blanking interval, or by any other suitable means. The color alignment between the first and second fields, and between the third and fourth fields, on the other hand, may be brought about automatically by a proper selection of sampling frequencies relative to line-scanning frequencies. Since in the pattern in FIG. 7 there is a color transposition between fields in a horizontal direction, such an arrangement will not normally permit the use of a colored line phophor tube such as may be utilized in connection with a system producing the pattern of FIG. 5. However, the pattern of FIG. 7 is readily obtainable with the projection superposition of images accomplished by apparatus such as shown in FIG. 4.

One additional sampling sequence of interest is that in which there is derived from the three-color camera 10 a panchromatic signal of full resolution. The gate 16 in FIG. 1 is then arranged to sample in sequence each color interleaved with the panchromatic signal. In other words, the panchromatic signal is sampled alternately with each component-color signal. Any desired dot pattern on the viewing screen may then be obtained by a proper choice of interlacing methods. The panchromatic picture would be produced at the receiver by signals of equal amplitude in the three component-color channels, or else by suitable white phosphor dots on the screen of the image-reproducing cathode-ray tube. It should be noted that in this event the resolution of the reproduced image is in a ratio of three panchromatic dots per line to one color dot (of each color) per line.

It will be noted that the color television system described above is compatible with present broadcasting practice in that the transmitted color signal may be reproduced in black-and-white by a standard monochrome receiver. While the two pulse envelopes which are then in effect superimposed on the screen of the cathode-ray tube at such a receiver during successive scansions of a particular line each includes a 2.68 mc. carrier signal, the latter is effectively doubled by the integrating action of the tube and by phase reversal to result in a 5.36 mc. carrier which cannot ordinarily be resolved by an observer. Furthermore, in black-and-white portions of an image or in any image region where modulation of the three color channels is approximately the same, the monochrome resolution and contrast range is satisfactory. Even in cases where reduced contrast in the monochrome reproduction might otherwise result from an image signal of substantially single-color modulation, the effect may be minimized by an adjustment of the relative gain in each of the three color-component channels at the transmitter (and in any color receiver) so as to emphasize a particular modulating signal such as green.

It will be appreciated that, in cases where the field repetition rate is sufficiently high, no integrating action is required at the receiver, and cathode-ray tubes having relatively low persistence phosphors may be used.

For monochrome transmission and reception no modifications of the dot-interlacing techniques set forth above need be made. However, since only a single input signal is to be sampled, the three component-signal channels of FIGS. 1 and 4 are reduced in number to one. Accordingly, for a desired bandwidth of 4 mc., for example, sampling of the black-and-white signal may be carried out at an 8 mc. rate to yield an image having almost twice the resolution of a standard 4 mc. system.

While the principles of the present invention have been set forth above in connection with one or more specific embodiments, it should be borne in mind that the invention also embraces a field-sequential system of color television employing the herein-disclosed interlacing techniques. In such cases, the scanning procedures made use of in dot-interlaced monochrome arrangements are utilized in conjunction with field-sequential color selectors so as to provide high resolution and to take maximum advantage of the assigned channel bandwidth. In a field-sequential system of the tricolor type, however, it will probably be found desirable to employ revised field and line scanning frequencies in order to reduce flickering to a minimum. These scanning rates might, for example, be such as to produce 60 fields per color per second, or a total of 180 fields per second, with 202½ lines per field and with alternate fields vertically interlaced to give a 405 line image. The line frequency would be 36.45 kilocycles and the gate frequency 8.05 megacycles per second. The resulting image contains 441 dots per horizontal line when interlaced in both directions. It should be noted that the horizontal resolution in this case is about 80% of the vertical resolution with a 4 to 3 image aspect ratio, and hence is about twice that which would be obtained when using the same line and field scanning rates but without horizontal interlacing. Moreover, the reproduced image will be entirely free of color crosstalk resulting from defects in the transmission system, although obviously the revised line and field scanning frequencies necessitate certain changes in presently-standard monochrome receivers to receive the color transmissions.

Having thus described the invention, what is claimed is:

1. Color television apparatus comprising means for forming a plurality of primary color images of an object, means for scanning the color images thus formed to develop a plurality of electrical waves each of which is representative of one of the said color images, means for obtaining time-spaced samples of each wave at a rate at least as high as the maximum frequency of the waves but not exceeding twice such maximum frequency thereby to develop a plurality of component-color pulse trains, means for interleaving the said pulse trains to form a composite-color pulse train, a filter having a passband of at least substantially one-half the repetition frequency of the pulses in said composite-color pulse train, and a circuit for applying said composite-color pulse train to said filter.

2. Color television apparatus in accordance with claim 1, further comprising means for generating blanking and synchronizing signals and for adding such signals to each of the waves which are representative of the said component-color images, and additional means for coordinating the operation of said sampling means with the generation of said blanking and synchronizing signals.

3. Color television apparatus in accordance with claim 2, further comprising means coordinated with the said blanking and synchronizing signal generating means for reversing the phase of operation of the said sampling means during alternate field-blanking signal intervals.

4. Color television apparatus comprising means for forming a plurality of color images of an object, means for scanning the color images thus formed to develop a plurality of electrical waves each of which is representative of one of the said color images, means for obtaining equally time-spaced samples of each wave at a rate at least as high as the maximum frequency of the wave but not exceeding twice such maximum frequency thereby to develop a plurality of component-color pulse trains, means for interleaving the pulse trains to form a composite-color pulse train, means for filtering the composite-color pulse train so as to obtain a composite-color signal the maximum frequency of which has a value equal at least to approximately one-half the repetition frequency of the pulses in said composite-color pulse train, means for applying the said composite-color signal to modulate a carrier wave for transmission, means for detecting the transmitted energy to obtain thee latter, means for sampling said composite-color signal in synchronism with the sampling operation at the transmitter to derive the original composite-color pulse train, means for separating the composite-color pulse train so derived into its component-color pulse trains, a plurality of component-color signal channels each of which includes an image-reproducing device, and means for respectively applying the said component-color pulse trains to said signal channels.

5. Color television apparatus comprising means for producing a plurality of color images of an object, means for scanning the color images thus formed to obtain a plurality of electrical waves each of which is representative of one of the said color images, means for obtaining time-spaced samples of each wave at a rate at least as high as the maximum frequency of the wave thereby to develop a plurality of component-color pulse trains, means for interleaving the pulse trains to form a composite-color pulse train, means for filtering the composite-color pulse train so as to obtain a composite-color signal having a predetermined maximum frequency, means for applying the said composite-color signal to modulate a carrier wave for transmission, means for detecting the transmitted signal to obtain the latter, means for sampling said composite-color signal in synchronism with the sampling operation at the transmitter to derive the original composite-color pulse train, means for separating the composite-color pulse train so derived into its component-color pulse trains, a plurality of component-color signal channels, and means for respectively applying the said component-color pulse trains to said signal channels.

6. Television apparatus comprising means for forming an electron image representative of an optical image, means for effecting a line-by-line scanning of said electron image thereby to develop line-signal waves, means for obtaining equally time-spaced samples of each line-signal wave at predetermined instants during alternate field-scannings of the electron image, means for obtaining in the remaining field-scannings of the electron image equally time-spaced samples of each line-signal wave at points intermediate those at which the first-mentioned samples are obtained, said sampling being performed at a rate at least as high as the maximum frequency of changes in the image information in each line-signal wave, a filter having a passband of at least substantially one-half the sampling rate, and a circuit for applying the output of said sampling means to said filter.

7. Television apparatus comprising means for forming an electron image representative of an optical image, a cathode-ray scanning device, means for effecting a horizontal, or line-by-line, scanning of said electron image during successive vertical, or field-scanning, operations of the cathode-ray beam such that one complete scansion of said electron image requires four successive field scansions, means for effecting a vertical displacement of the image raster area by the width of a single line after each two successive field-scanning operations, means for obtaining equally time-spaced samples of each line-signal wave at predetermined instants in alternate sets of two field-scannings, during which the image raster area is vertically displaced, means for obtaining in the remaining field-scanning operations equally time-spaced samples of each line-signal wave at points intermediate those at which the first-mentioned samples are obtained, said sampling being performed at a rate at least as high as the maximum frequency of changes in the image information in each line-signal wave, a filter having a passband from zero frequency to at least susbtantially one-half the sampling frequency, and a circuit for applying the output of said sampling means to said filter.

8. Television apparatus comprising means for forming an electron image representative of an optical image, means for effecting a line-by-line scanning of said electron image thereby to develop line-signal waves, means for obtaining equally time-spaced samples of each line-signal wave at predetermined points during alternate field scannings of the electron image, means for obtaining in the remaining field-scannings of the electron image equally time-spaced samples of each line signal wave at instants intermediate those at which the first-mentioned samples are obtained, said sampling being performed at a rate at least as high as the maximum frequency of changes in the image information in each line-signal wave, a filter having a passband from zero frequency to at least substantially one-half the sampling frequency, a circuit for applying the output of said sampling means to said filter, means for applying the output of said filter to modulate a carrier wave for transmission, means for detecting the transmitted energy, means for sampling the detected signal in synchronism with the sampling operations at the transmitter, an image-reproducing device, and means for applying the output of said sampling means to said image-reproducing device in such a manner that the reproduced image is effectively made up of a plurality of discrete areas which are interlaced in a line-scanning direction during successive field-scanning operations of the electron beam of said image-reproducing device.

9. Color television apparatus comprising means for forming a plurality of primary color images of an object, means for effecting simultaneous line-by-line scanning of each such primary color image thereby to develop a plurality of line-signal waves, means for successively obtaining time-spaced samples of each line-signal wave at predetermined instants during alternate field-scannings of each primary color image, means for obtaining in the remaining field-scannings of each primary color image time-spaced samples of each line-signal wave at points intermediate those at which the first-mentioned samples are obtained, said sampling being performed at a rate at least as high as the maximum frequency of changes in the image information in the line-signal wave, a low-pass filter, and a circuit for applying the output of said sampling means to said filter.

10. Color television apparatus comprising means for forming a plurality of primary color images of an object, means for scanning the color images thus formed to develop a plurality of electrical waves each of which is representative of one of the said color images, a generator of sampling impulses, said generator having a frequency of operation at least as high as the maximum frequency of the said electrical waves, means for applying the output of said generator to effect a sampling of each of the said electrical waves in succession so as to develop a composite-color pulse train composed of a series of interleaved component-color pulse trains, a phase inverter operating at a rate lower than the frequency of the sampling impulse generator, and means for applying the output of said phase inverter to shift by 180° the phase of the pulses in the output of said sampling impulse generator.

11. Television apparatus in accordance with claim 10, further comprising a low-pass filter having an upper cut-off frequency at least as high as the repetition frequency of the pulses in said composite-color pulse train, means for applying said composite-color pulse train to said filter, a carrier wave generator, and means for applying the output of said filter to modulate said carrier wave generator thereby to develop a television signal for transmission.

12. Television apparatus in accordance with claim 11, further comprising means for receiving the transmitted television signal, means for sampling the received signal in accordance with the sampling operation at the transmitter, means for separating the sampled signal into its constituent component-color pulse trains, a plurality of image-reproducing devices, means for respectively applying each separated component-color pulse train to its respective image-reproducing device so as to develop a component-color iamge, and means for optically superimposing on a viewing screen the component-color images thus produced so that the composite-color image thus formed will be composed of a series of lines each of which is made up of a plurality of interlaced discontinuous image areas representative of corresponding areas of the individual component-color images.

13. In a color television system, the combination of a plurality of signal channels, devices for producing in each of said channels a set of signals within a given frequency band, said sets of signals representing respectively different color components of an image being transmitted, means for generating a reference wave having a frequency within, and adjacent to one limit of, said frequency band, means for utilizing said reference wave to derive a plurality of signals dependent in amplitude upon the respective amplitudes of the signal outputs from said channels and corresponding respectively in phase to different phases of the reference wave, a transmitter, connections for conducting said derived signals from the utilizing means to the transmitter, and a filter in said connections operating to pass only signals having frequencies within said frequency band so as to eliminate harmonics of the reference frequency and to limit the signal frequencies delivered to the transmitter to double sideband components of some of said color representative signals and to single sideband components of others of said color representative signals.

14. In a color television receiver, the combination including: means for receiving a composite signal including a modulated subcarrier wave which at phases differing by angles substantially different from 90° represents different colors of an object; means for producing a plurality of control waves having substantially the same frequency as that of said subcarrier wave and mutually distinguishing phases bearing a given relationship to said subcarrier wave phases; signal sampling means responsive to said composite signal and to said control waves and operative to produce a plurality of color representative signals; color image reproducing means; and means responsive to said produced color representative signals to control said color image reproducing means for reproducing a color image.

15. In a color television receiver, the combination as defined in claim 14 wherein, said sampling means is in the form of gated amplifying apparatus.

16. In a color television receiver, the combination as defined in claim 14, wherein said sampling means is in the form of modulating apparatus.

17. In a color television transmitter, the combination including: a source of image signals representative of the colors of an object; an oscillator for producing a substantially sinusoidal wave; means for deriving from said oscillator a plurality of output waves having the same frequency and mutually distinguishing phases differing by angles substantially different from 90°; means including signal sampling means responsive to said image signals and to said oscillator output waves and operative to produce a modulated subcarrier wave having mutually distinguishing phases differing by said angles and respectively representative of said object colors; and means for transmitting said produced modulated subcarrier wave as one component of a composite signal.

18. In a color television transmitter, the combination as defined in claim 17 wherein, said sampling means is in the form of a plurality of gate amplifiers.

19. In a color television transmitter, the combination as defined in claim 17 wherein, said sampling means is in the form of a plurality of modulators.

20. In a color television system, the combination including: a source of image signals representative of the colors of an object; means for producing a plurality of reference waves having the same frequency and mutually distinguishing phases differing by angles substantially different from 90°; means including first signal sampling means responsive to said image signals and to said reference waves and operative to produce a modulated subcarrier wave having mutually distinguishing phases differing by said angles and respectively representative of said object colors; means for producing a plurality of control waves having substantially the same frequency as that of said modulated subcarrier wave and mutually distinguishing phases bearing a given relationship to said subcarrier wave phases; second signal sampling means responsive to said modulated subcarrier wave and to said control waves and operative to produce a plurality of color representative signals; and means responsive to said produced color representative signals to produce a color image.

21. In a color television system, the combination as defined in claim 20 wherein, at least one of said sampling means is in the form of gated amplifying apparatus.

22. In a color television system, the combination as defined in claim 20 wherein, at least one of said sampling means is in the form of modulating apparatus.

23. In a color television system: means for producing a plurality of signals respectively representative of different color components of a television picture; means for producing a plurality of differently phased waves of the same frequency, said frequency being substantially higher than the horizontal line scanning frequency of said system; means for utilizing said color representative signals and said waves to produce a combined signal at said wave frequency, said combined signal having components in said different phases respectively representative of different ones of said color representative signals; and means for transmitting said combined signal as one component of a composite signal through a transmission channel having an upper cut-off frequency higher than said wave frequency but less than twice said wave frequency.

24. The apparatus of claim 23 further characterized in that another component of said composite signal is a signal of frequency lower than said cut-off frequency and of reference phase for said combined signal.

25. In a receiver for a composite color television signal comprising a modulated subcarrier which is amplitude modulated in different phases to represent different color components of a television picture and a color synchronizing signal of reference phase for said modulated subcarrier, means responsive to said color synchronizing signal to produce a plurality of control waves of substantially said subcarrier frequency and of different phases, and means for utilizing said control waves respectively to control the demodulation of said modulated subcarrier in different phases to derive a plurality of video signals respectively representative of said different color components.

26. In a color television receiver: means for receiving a composite television signal including a modulated subcarrier wave which at phases differing by angles substantially different from 90° represents different color components of a television picture; means for producing a plurality of waves of substantially the same frequency as said modulated subcarrier wave and of different phases bearing predetermined relationships to said subcarrier wave phases; and means responsive to said modulated subcarrier wave and to said produced waves to derive, from said modulated subcarrier wave, signals representative of said color components.

27. In a color television receiver: means for receiving a composite television signal having components confined to a given video frequency band and including a modulated subcarrier wave having a frequency within, and adjacent to the upper limit of said band, said subcarrier wave being modulated at different phases by color video signals of frequencies lower than said subcarrier frequency; means for producing a plurality of control waves having substantially the same frequency as that of said modulated subcarrier wave and mutually distinguishing phases bearing a given relationship to said phases at which said subcarrier wave is modulated by said color video signals; and means responsive to said modulated subcarrier wave and to said control waves for deriving said color video signals from said modulated subcarrier wave.

28. In a color television receiver for receiving a composite color television signal occupying a predetermined frequency band and including a modulated subcarrier wave component having a nominal frequency within and near one end of said band, said subcarrier wave being modulated at different phases to represent different color components of a television picture: signal translating means for said received composite signal having a passband including the frequency of said modulated subcarrier wave component and not substantially wider than said predetermined frequency band; means responsive to the signal translated by said translated means to produce a plurality of control waves at the same frequency as the modulated subcarrier wave component of said translated signal and at different phases respectively corresponding to said color component representative subcarrier wave phases; and means responsive to said translated signal and to said control waves for deriving signals representative of said color components from said translated modulated subcarrier wave.

29. In a color television receiver for receiving a composite color television signal occupying a predetermined frequency band and including a modulated subcarrier wave component having a nominal frequency within and near one end of said band, said subcarrier wave being modulated at different phases to represent different color components of a television picture: signal translating means for said received composite signal having a passband including the frequency of said modulated subcarrier wave component and not substantially wider than said predetermined frequency band; means responsive to the signal translated by said translating means to produce a plurality of control waves at the same frequency as the modulated subcarrier wave component of said translated signal and at different phases respectively corresponding to said color component representative subcarrier wave phases; and means responsive to said translated signal and to said control waves for deriving signals representative of said color components from said translated modulated subcarrier wave.

30. In a receiver for a carrier wave modulated with a composite color video signal of limited bandwidth, said video signal having a modulated subcarrier wave component whose frequency is near the upper limit of said band and which is modulated at different phases to represent different color components of a televised scene: means adapted to be supplied with said modulated subcarrier wave and to demodulate said subcarrier wave at said different phases; and means for supplying said received signal to said demodulating means, said translating means having a bandwidth which is not substantially greater than said limited bandwidth and comprising means for detecting the video modulation of said modulated carrier wave.

31. In a color television receiver for a radio-frequency carrier wave modulated with a composite color television video signal of predetermined limited bandwidth, said video signal including a modulated subcarrier wave near one end of said band modulated at different phases to represent different color components of a televised scene: means for producing a plurality of control waves at the frequency of said modulated subcarrier wave and bearing predetermined phase relations to said color component modulated phases of said subcarrier; means adapted to be supplied with said modulated subcarrier wave and with said control waves and responsive thereto to produce a plurality of signals respectively representing the modulations of said subcarrier wave at said control wave phases; and signal translating means for supplying said received signal to said control wave responsive means, said translating means having a bandwidth which is not substantially greater than said limited bandwidth and comprising means for demodulating said video signal modulation from said carrier wave.

32. In a color television transmitter: means for producing a plurality of signals respectively representing the intensities of different color components of a television picture; means for producing a plurality of substantially sinusoidal waves of the same frequency and different phases; and means for utilizing said color representative signals and said sinusoidal waves to produce a composite signal including a component representative of the brightness of said television picture and a modulated subcarrier having differently phased components respectively representative of said different color components.

33. In a color television receiver: means for receiving a composite television signal including a component representative of the brightness of a television picture and a modulated subcarrier wave having differently phased components respectively representative of different color components of said picture; means for producing a plurality of waves of substantially the same frequency as said modulated subcarrier wave and of different phases bearing predetermined relationships to said subcarrier wave components; and means responsive to said composite signal and to said produced waves to derive signals representative of said color components.

(References on following page)

References Cited in the file of this patent

UNITED STATES PATENTS

| | | |
|---|---|---|
| 2,021,743 | Nicolson | Nov. 19, 1935 |
| 2,048,081 | Riggs | July 21, 1936 |
| 2,256,317 | Earp | Sept. 16, 1941 |
| 2,431,115 | Goldsmith | Nov. 18, 1947 |
| 2,465,371 | Grieg | Mar. 29, 1949 |
| 2,677,720 | Bedford | May 4, 1954 |
| 2,678,348 | Ballard | May 11, 1954 |
| 2,810,781 | Evans | Oct. 22, 1957 |

FOREIGN PATENTS

| | | |
|---|---|---|
| 473,205 | Italy | July 18, 1952 |

OTHER REFERENCES

Loughlin: Recent Improvements in Band-Shared Simultaneous Color-Television Systems, proceedings of the I.R.E., October 1951, page 1267 cited.